United States Patent [19]
Shoberg

[11] 3,969,935
[45] July 20, 1976

[54] LOAD CELL

[75] Inventor: Ralph S. Shoberg, Farmington Hills, Mich.

[73] Assignee: GSE, Inc., Farmington Hills, Mich.

[22] Filed: Oct. 29, 1974

[21] Appl. No.: 518,455

[52] U.S. Cl. .................................. 73/141 A; 338/5
[51] Int. Cl.² .......................................... G01L 1/22
[58] Field of Search ............... 73/141 A, 88.5 R; 338/5

[56] References Cited
UNITED STATES PATENTS

| | | | |
|---|---|---|---|
| 2,957,350 | 10/1960 | Kolb | 73/141 A X |
| 2,997,875 | 8/1961 | Moore | 73/141 A |
| 3,004,231 | 10/1961 | Laimins | 73/141 A X |
| 3,320,569 | 5/1967 | Jones | 73/141 A X |
| 3,376,537 | 4/1968 | Pugnaire | 73/141 A X |
| 3,513,431 | 5/1970 | Kovacs | 73/141 A X |
| 3,613,443 | 10/1971 | Curry | 73/147 |
| 3,771,359 | 11/1973 | Shoberg | 73/141 A |

*Primary Examiner*—Charles A. Ruehl
*Attorney, Agent, or Firm*—Thomas N. Young

[57] ABSTRACT

A load cell of the shear-link type comprising a solid body of high modulus of elasticity material having a longitudinal axis of sensitivity and longitudinally spaced transverse slots entering the body from opposite directions to define the shear link. The body is bored out in the area of the shear link to create a stress concentration which is monitored using bonded-on strain gage resistors connected in a Wheatstone bridge circuit.

6 Claims, 6 Drawing Figures

U.S. Patent   July 20, 1976   3,969,935
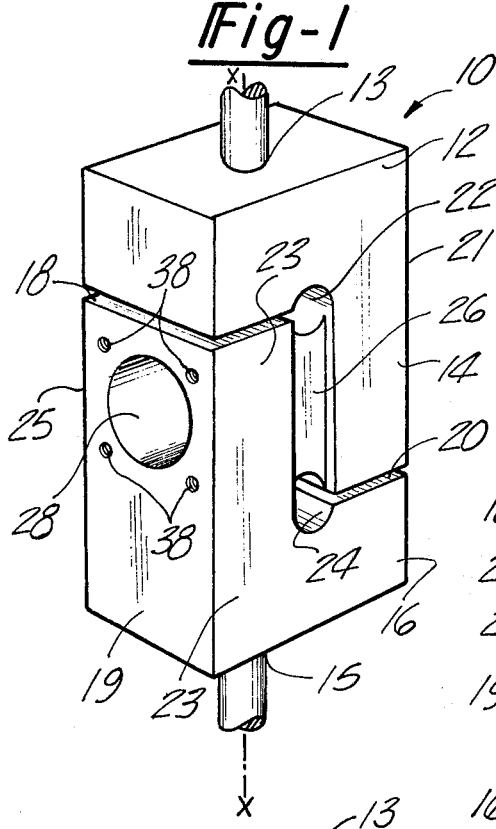
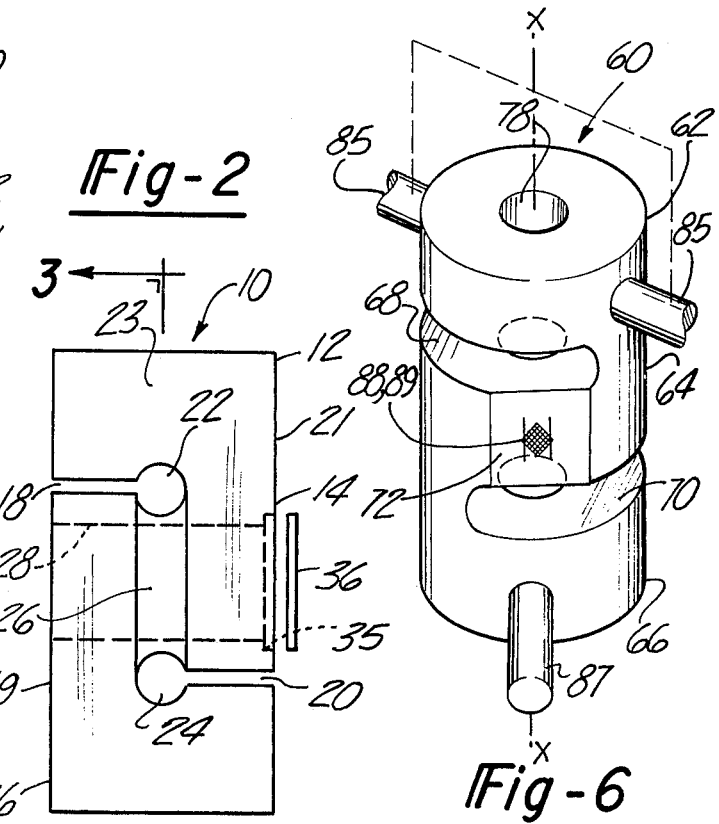
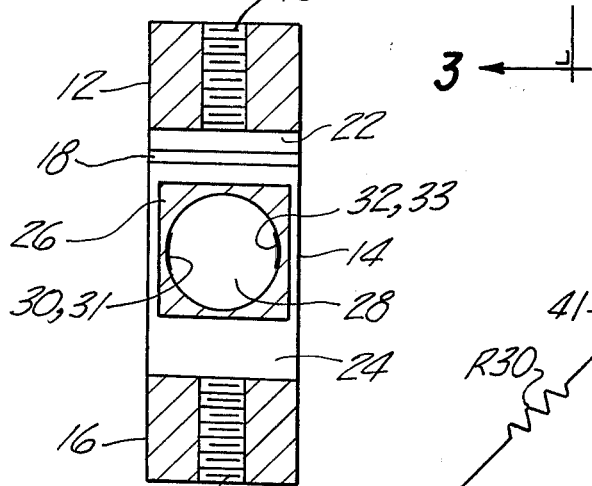
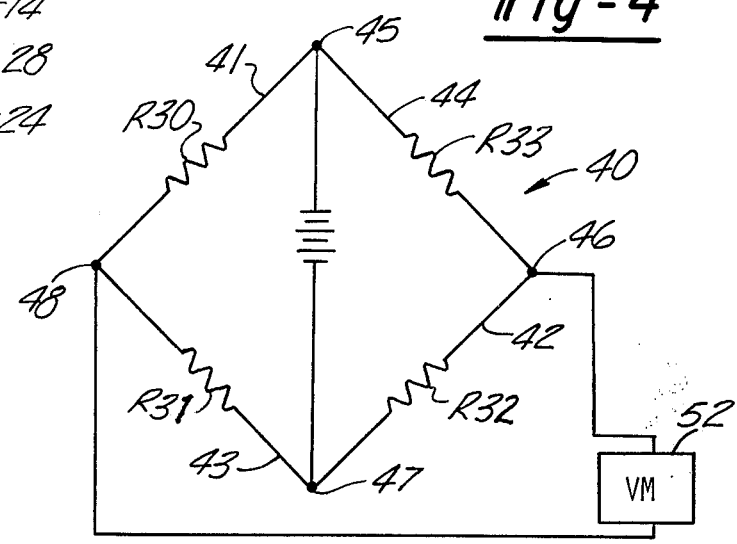

LOAD CELL

INTRODUCTION

This invention relates to force transducers, commonly called load cells, and particularly to a force transducer of the shear-link type for measuring tension and compression along a single axis of sensitivity.

BACKGROUND OF THE INVENTION

Single axis force transducers are well known and find application in many situations where load and stress analysis is desired. For example, it is quite common to employ force transducers in the testing of numerous automotive components in a variety of environments. However, each application generally requires a specially designed transducer to meet specific needs and consequently cost is an important factor in their design.

Tension in a load-carrying structure is commonly measured by inserting a load cell into the structure as a link through which the load force passes. The load cell is implemented with suitable signal-generating devices so as to produce an output proportional to load along the measurement axis.

Such cells may be constructed in a variety of configurations, most of which are characterized by stress concentrating areas to maximize elastic distortion. The more complicated the configuration, however, the more expensive is the load cell to manufacture. Accordingly, it is desirable to provide a simple, easily machined configuration susceptible of many differeing implementations.

SUMMARY OF THE INVENTION

The subject invention provides a simple but effective single axis load cell of the type adapted to be used as a load bearing link wherein the stress concentrating area is easily machined in any of a variety of implementations, and wherein tension or compression forces are measured as a function of a shear-type strain. In general, this is accomplished by providing a body of high modulus material having a longitudinal axis which is also the measurement axis, and wherein a shear-link flexure area is formed by two longitudinally spaced transverse slots which enter the body from opposite sides. Stress is concentrated by forming a through bore in the body between the slots. Strain gage resistors are located around the flexure area to measure elastic distortion caused by shear forces. The resistors are connected in a bridge circuit to produce a signal proportional to load.

In one embodiment of the invention, to be described in detail, the body of the transducer has an overall rectangular shape. Slots are formed halfway through the body near the top of one side and the bottom of the opposite side, thereby giving the transducer an S-shaped appearance. The central portion of the remaining two-side surfaces are relieved between the slots reducing the cross-sectional area of the center of the body. A bore is formed through the body between the slots and the two relieved surfaces creating the flexure or stress concentrating areas of the transducer. Laminated pairs of strain gage resistors are disposed on the flexure areas to monitor the forces exerted on the transducer body parallel to its longitudinal axis.

An alternative embodiment comprises a force transducer having a cylindrical body again having a shear-link flexure area created by two longitudinally spaced transverse slots in the body. The bore is formed through the body along its cylindrical axis and the slots are formed perpendicular to the cylindrical axis to a depth beyond the bore. The opposing side surfaces of the cylinder between the overlap of the two slots are truncated within the proximity of the bore, thus forming the stress concentrating areas upon which are disposed the laminated pairs of strain gage resistors. Tension and compression forces applied parallel to the cylindrical axis of the transducer are measured.

Still a third alternative to be described in detail comprises a force transducer having a relatively thin-walled tubular body with its central part having portions of its outer surface flattened at 90° intervals along its circumference. Four slots are formed in the body of the transducer between the flattened surfaces with each adjacent slot alternating above and below the flattened surfaces. A single strain gage resistor is disposed on each of the flat surfaces and interconnected in a bridge network which measures the forces applied parallel to the tubular axis of the transducer.

Other variations, features and advantages of the invention will become apparent from a reading of the following specification which describes three specific and preferred embodiments of the invention in detail.

BRIEF DESCRIPTION OF THE DRAWINGS

FIG. 1 is a perspective view of a single axis load cell embodying the invention;

FIG. 2 is a front view of the load cell of FIG. 1;

FIG. 3 is a sectional view of the load cell of FIG. 2 taken along line 3—3; FIG. 4 is an enlarged view of a portion of the inner surface of the bore showing the orientation of the strain gage resistors thereon;

FIG. 5 is an electrical schematic diagram of a bridge network for use in connection with the strain gage resistors for measuring the forces applied to the transducer; and FIG. 6 is an alternative embodiment of the force transducer of FIG. 1.

DETAILED DESCRIPTION OF THE SPECIFIC EMBODIMENTS

Referring to FIGS. 1 through 3, a single axis force transducer 10 having longitudinal axis of sensitivity X—X is shown to comprise a solid body of high modulus of elasticity material such as aluminum or steel. The body is generally rectangular and symmetrical about axis X—X but is divided into a central flexure portion 14 and opposite end portions 12 and 16 by longitudinally spaced transverse slots 18 and 20 which enter the body from opposite lateral surfaces 19 and 21 respectively. The slots extend about half-way across the body and define a shear link structure, i.e., a structure adapted to form a load bearing link for forces along the X—X axis and in which the center portion 14 is instrumented to respond to loads by measurement of shear forces.

Holes 22 and 24 are bored through the transducer body at longitudinally spaced locations to terminate the slots 18 and 20. The plane faces 23 and 24 are grooved or relieved between the holes 22 and 24 as shown at 26. Finally a through-bore 28 is formed laterally between surfaces 19 and 21 to provide thin-walled flexure areas between the bore 28 and the grooves 26 for the concentration of strain when the body is loaded. Laminated strain gage pairs 30, 31, and 32, 33 are insulatively bonded to the flexure areas by location within the bore 28 as best shown in FIG. 3. Tapped holes 13 and 15 permit threaded rods or other connectors to be attached to the body for the imposition of a load. Once the gages are mounted and wired, the bore 28 may be sealed in any conventional manner such as, for example, countersinking the opening as shown in FIG. 2 at 35 and gluing a disc 36 into the opening. Alternatively, as in FIG. 1, a plate (not shown) may simply be placed over the opening and fastened to a set of holes 38.

In an actual embodiment made of anodized aluminum, the transducer body is three inches long by one inch wide by one-half inch thick. The bore 28 is three-quarters of an inch in diameter and the centers of holes 22 and 24 are 1.250 inches apart and on the centerline axis X—X. Slots 18 and 20 are 0.09 inches thick and the device has a load capability of 1000 lbs. Of course, these dimensions are given strictly by way of example as other materials and load ranges may be desired.

The gages 30 and 31 are shown in FIG. 4 to comprise standard metal foil resistors responsive to flexure to vary in electrical resistance value. The gages 30 and 31 are insulatively laminated over one another within bore 28 with the axes oriented at 90° from one another as shown in FIGS. 3 and 4. Gages 32 and 33 are similarly mounted. In each case, the gages are aligned at 45° relative to axis X—X.

The gages 30 through 33 are electrically connected such as by fine wires into a bridge circuit as shown in FIG. 5 to produce an output voltage across terminals 46 and 48 when the transducer is loaded along axis X—X. A dc source 50 is connected across terminals 45 and 47 to provide a supply for the output voltage. The output is measured by meter 52. The resistance values of the gages are all nominally the same and the meter is typically nulled when no load is applied. Output readings may be calibrated into any desired system of standards.

In FIG. 6, the second embodiment of the invention there illustrated comprises a transducer 60 having a cylindrical body of high modulus material and a longitudinal axis of sensitivity X—X. Longitudinally spaced slots 68 and 70 are formed transversely and oppositely into the body to define a shear-link device having a central flexure area 64. The slots extend just beyond the centerline of the body as shown. The flexure areas are defined by laterally opposite flats 72 and a longitudinal bore 78 which extends fully through the body from one end to the other. The portions of the bore in end sections 62 and 66 may be tapped to accept load link connectors. Alternatively, the load may be applied by means of a clevis arrangement which attaches the pins 85 and 87.

As was the case for transducer 10, the combination of the bore 78 and the flats define flexure areas onto which strain gages are bonded. The flats 72 correspond to grooves 26 and bore 78 corresponds to bore 28. The flexure areas are subjected to shear loading when the body is loaded along the X—X axis.

The strain gages are again disposed on the flats 72 in laminated pairs so as to respond only to shear forces in the flexure areas. Pair 88, 89 is representative. The four resistor gages in the two pairs are connected into a bridge circuit identical to that of FIG. 5.

The transducers 20 and 60 show the several variations which are possible; i.e., the body may be variously shaped, the bore which defines the flexure areas may be longitudinal or lateral, the slots may be of various depths, the load applying apparatus may vary, and the gages may be internal or external. The features of one embodiment may be substituted for the corresponding features of the other.

Various additional changes may also be made. For example, the body of the transducer 60 may be made with a substantially reduced wall thickness. Also, additional slots may be formed into the bodies coplanar with but orthogonal to the illustrated slots and four exterior flats may be provided instead of two. In this latter case, the gages may be located one to a flat instead of in laminated pairs. Various types of covers and load application devices may be employed with the various transducers shown.

Although the invention has been described as embodied in a discrete device having terminal ends to which a primary load-bearing structure is attached, the flexure configuration including the transverse slots and bore may be introduced directly into the primary load bearing structure itself, thus requiring no separately connected link. In this case, the terminal or end portions may be viewed simply as those portions of the structure which lie longitudinally outward of the transverse slots.

What is claimed is:

1. A single axis force transducer comprising: a solid body of high modulus of elasticity material having a longitudinal axis of sensitivity, said body being configured to define first and second longitudinally spaced transverse slots oppositely opening into the body, said slots defining first and second end portions and a central flexure portion acting as a shear-link between said end portions, a bore formed through said central portion creating stress concentrating flexure areas on opposite sides thereof, and strain gage means disposed on said flexure areas in orthogonal pairs and responsive only to shear forces in the flexure areas as a result of a load having a component applied along the longitudinal axis of the transducer, said bore being formed between said slots and perpendicular to the longitudinal axis of the transducer body.

2. The force transducer of claim 1 wherein said body is rectangular in cross-section.

3. The force transducer of claim 1 wherein said end portions each contain an internally threaded hole formed along the longitudinal axis of the transducer.

4. The force transducer of claim 1 wherein said strain gage means include two pairs of strain gage resistors, said resistors having a principal axis of sensitivity thereof, said pairs comprising one resistor disposed over the other with their principal axes of sensitivity being mutually orthogonal and oriented 90° with reference to the axis of the transducer.

5. The force transducer of claim 4 wherein said strain gage means further include a bridge network comprising said two pairs of strain gage resistors.

6. A single-axis force transducer comprising: a solid integral body of high modulus of elasticity material having a longitudinal axis and including first and second end portions and a central portion, said portions being defined by a pair of axially-spaced, oppositely oriented slots formed in said body and extending across the axis thereof such that said central portion is a transversely extending shear-link between said end portions, a bore formed through said central portion substantially parallel to the slots and orthogonal to said axis, said body being externally configured to reduce the area proximate the bore to create stress concentrating areas in said central portion and on opposite sides of the bore, and strain gage means disposed in orthogonal pairs on said stress concentrating areas within said bore and responsive only to shear stress resulting from load forces applied along the longitudinal axis of the transducer.

* * * * *